Figure 1:
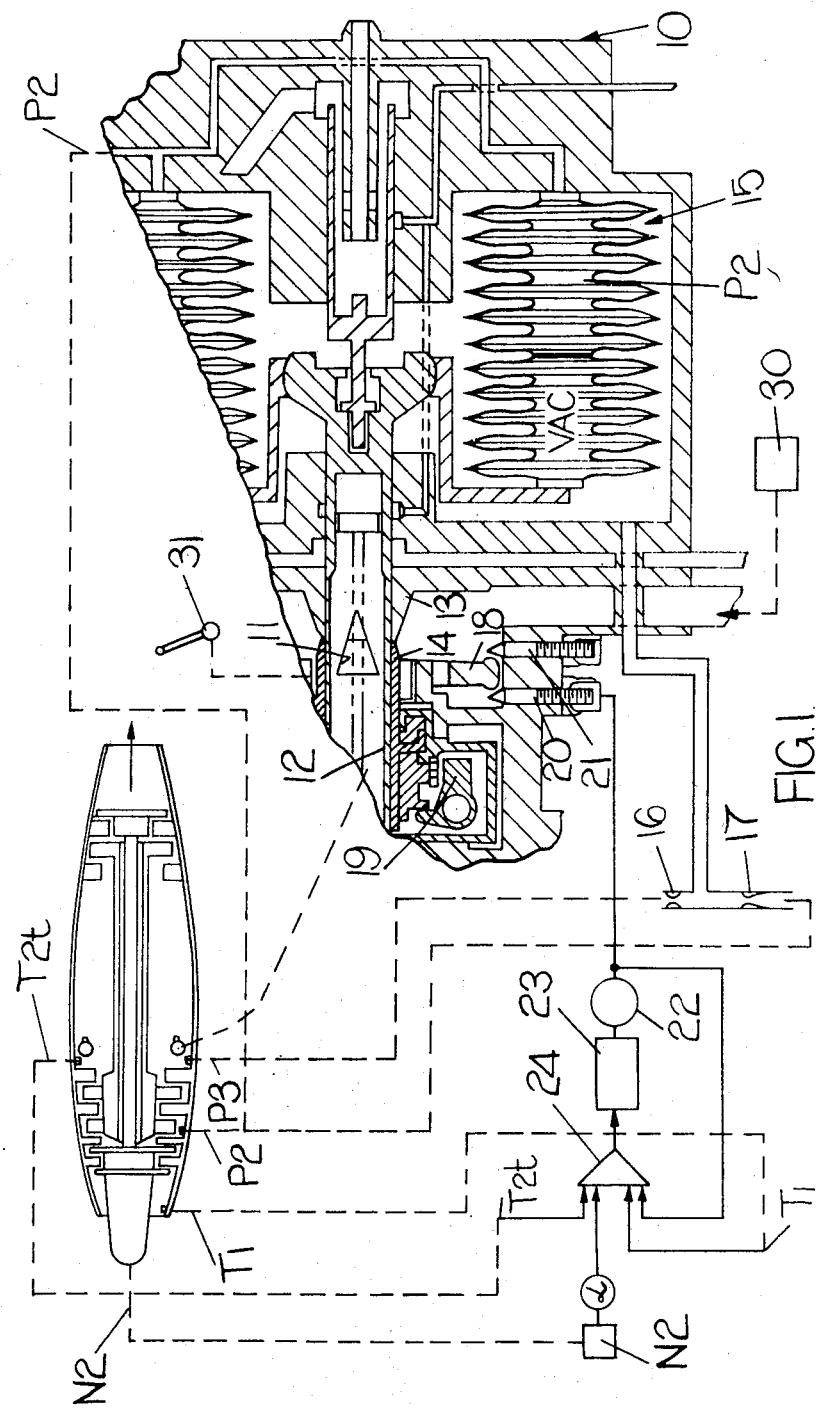

United States Patent [19]

Warne

[11] 3,772,882
[45] Nov. 20, 1973

[54] FUEL CONTROL SYSTEMS FOR GAS TURBINE ENGINES

[75] Inventor: Eugene Harold Warne, Markgroningen-Talhausen, Germany

[73] Assignee: Joseph Lucas (Industries) Limited, Birmingham, England

[22] Filed: Dec. 2, 1971

[21] Appl. No.: 204,107

[52] U.S. Cl. .................................... 60/39.28 T
[51] Int. Cl. ........................................ F02c 9/08
[58] Field of Search ............... 60/39.28 T, 39.28 R

[56] References Cited
UNITED STATES PATENTS

| 2,954,669 | 10/1960 | Williams | 60/39.28 T |
|---|---|---|---|
| 2,971,335 | 2/1961 | Polye | 60/39.28 T |
| 3,128,603 | 4/1964 | Haigh | 60/39.28 T |
| 3,128,946 | 4/1964 | Hoberman | 60/39.28 T |
| 3,158,996 | 12/1964 | Herbert | 60/39.28 T |
| 2,971,339 | 2/1961 | Gold | 60/39.28 T |
| 3,076,312 | 2/1963 | Haigh | 60/39.28 T |
| 3,291,146 | 12/1966 | Walker | 415/17 X |
| 3,514,948 | 6/1970 | Warne | 60/39.28 R |
| 3,534,550 | 10/1970 | Bottoms | 60/39.28 R |

Primary Examiner—Clarence R. Gordon
Attorney—Holman & Stern

[57] ABSTRACT

A fuel control system includes an acceleration control sensitive to a plurality of engine parameters means sensitive to a so-called hot re-slam condition of the engine and producing an electrical output and means actuable by this output to reduce the maximum fuel flow to the engine.

15 Claims, 3 Drawing Figures

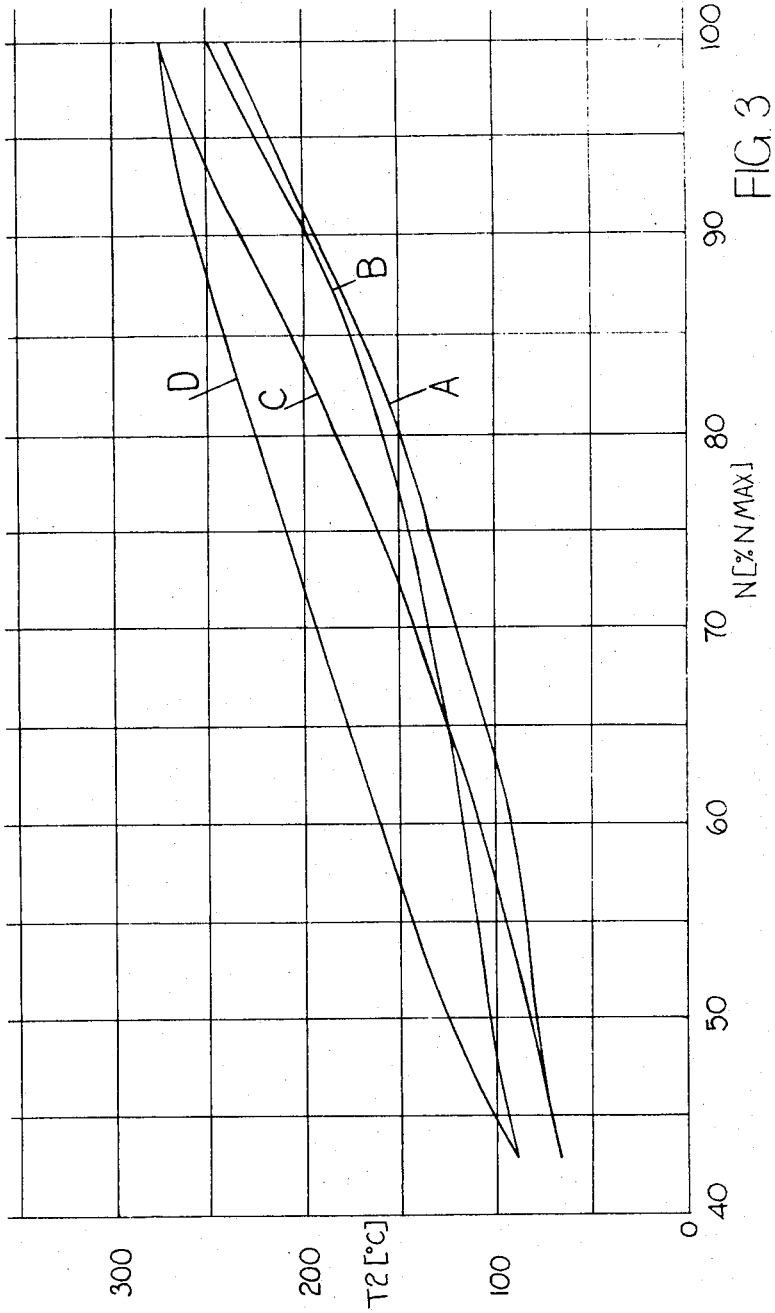

FUEL CONTROL SYSTEMS FOR GAS TURBINE ENGINES

In gas turbine engines it has been noted that difficulty occurs when, after a period of steady running with the throttle fully open, the throttle is closed quickly and then fully reopened quickly after a short time. This condition is known as the hot re-slam condition. In this condition there has been a tendency for the engine to surge or stall.

This tendency has, in the past, been countered by, setting the acceleration control of the engine to limit the acceleration margin to a level such that surging and stalling is avoided. This however, also places a limitation on normal acceleration and this is clearly undesirable.

The suggested theoretical explanation for hot re-slam surging or stalling is that, the compressor of the engine absorbs heat during steady running until it reaches an equilibrium temperature. On closing of the throttle the rate of flow of air through the compressor is reduced and the amount of work being done upon the air is also reduced so that the compressor starts to cool, giving up its heat to the air passing relatively slowly through it. The air is thus ejected into the engine combustion chamber at a temperature which is higher than normal. If slow running continues for some time all the stored heat in the compressor will be dissipated and there will be no trouble when acceleration starts. If, however, the throttle is reopened very soon after closing the air entering the combustion will still be too hot with the result that the amount of excess fuel admitted for acceleration in normal conditions, will be too great to ensure smooth acceleration.

It is thus an object of the invention to provide fuel control systems in which hot re-slam conditions are allowed for without permanently reducing the acceleration of the engine. In accordance with the invention there is provided a fuel control system for a gas turbine engine including acceleration control means sensitive to a plurality of engine operating parameters for controlling the rate of flow of fuel to the engine in accordance with said parameters during acceleration of the engine, means sensitive to an engine condition in which air passing through the compressor of the engine is heated by heat stored in the compressor during previous deceleration and arranged to produce an electrical output during such a condition and means actuable by said output for reducing the maximum fuel flow to the engine permitted by said acceleration control means.

Figure 2:
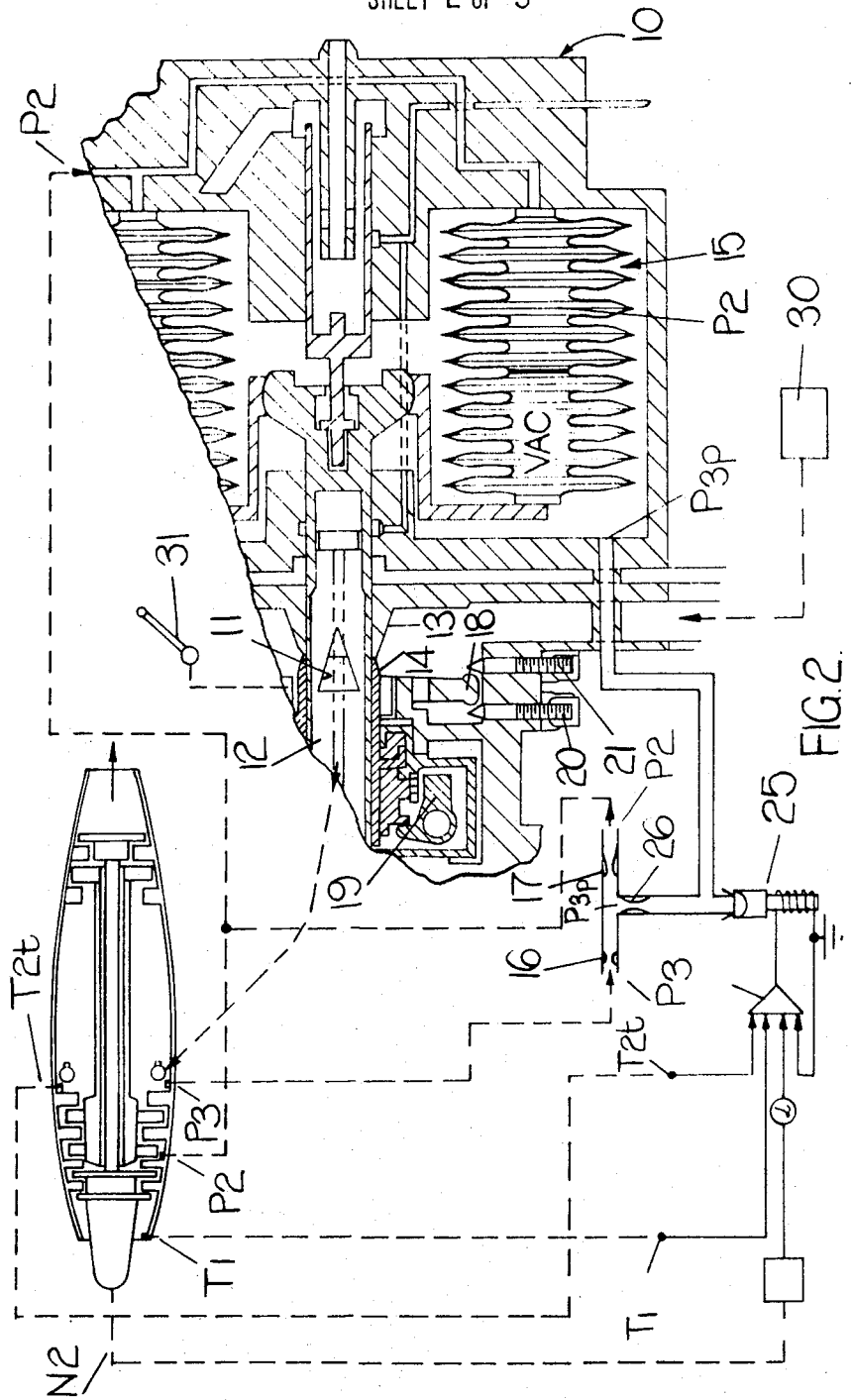

In the accompanying drawings FIGS. 1 and 2 illustrate two examples of the invention as applied to a known type of combined acceleration and speed control system, and FIG. 3 is a graph showing the heating characteristics of a typical engine.

Referring firstly to FIG. 3, there are shown therein four characteristic plots of the temperature of the air leaving the engine compressor (shown as the ordinate) against the engine speed (shown as the abscissa). The plot A indicates how the temperature rises during normal acceleration from cold. This curve approximates to the equation $T_{2c} = T_1 + \alpha N^2$. Where $T_{2c}$ is the cold acceleration compressor output temperature, $T_1$ is the compressor intake temperature, $\alpha$ is a constant and $N$ is the engine speed. The plot B shows the curve for hot acceleration. The curve C shows the steady state temperature and the curve D shows how the temperature falls during normal deceleration after a period of full speed steady running.

In the system described there is a pump 30 which supplies fuel under pressure to a fuel flow regulator 10 only part of which is shown. The regulator 10 includes a metering orifice defined by an aperture 11 in a longitudinally slidable sleeve 12 which fits within a fixed collar 13 and on which a slidable collar 14 is fitted, the flow area of the orifice being dependent on the axial positions of both the sleeve 12 and the collar 14.

The sleeve 12 is a movable axially by a pressure sensing unit 15 which includes a plurality of resilient bellows acted upon internally by a pressure signal tapped from the low pressure side of the compressor of the engine controlled (this is referred to herein as pressure $P_2$) and externally by a pressure signal $P_{3P}$ derived by passing air at pressure $P_3$ from the delivery side of the compressor through a pair of orifices 16 and 17 to the intake side of the compressor and applying the pressure existing between the orifices to the exterior of the bellows. Increasing $P_{3P}$ will urge the sleeve 12 to the left as viewed in FIG. 1 and will thereby decrease the open area of the orifice 11. Increasing $P_{3P}$ will, on the other hand urge the sleeve 12 in the opposite direction.

The collar 14 is movable in one direction by a lever 18 which is variably spring loaded according to the position of a throttle linkage 31. Also acting on the collar 14 are governor weights 19 which urge it in the opposite direction, i.e., towards the fixed collar 13.

Two stops 20, 21 are provided for limiting opening and closing movement of the collar 14, such stops co-acting with the lever 18. The stops are adjustable in both examples of the invention and in the case of the example shown in FIG. 1 the stop 20 is also movable by a servo-motor 22 diagrammatically shown coupled to the stop 20.

For driving the motor 22 there is a power amplifier 23 which receives an input from an amplifier 24 which incorporates a summing network so as to produce an output proportion to the algebraic sum of its input signals, which are four in number. Firstly, there is a signal $T_{2t}$ generated by a thermo couple or other temperature sensing device situated immediately downstream of the compressor. This supplies a signal of positive polarity. The remaining signals are of negative polarity and comprise a feedback signal from a potentiometer or the like driven by the motor 22, a temperature signal $T_1$ from a thermo couple or other temperature sensing device immediately upstream of the compressor and a mechanism and/or electronic circuit for producing a signal equal to the product of a known constant $\alpha$ and the square of the engine speed $N^2$.

When the motor 22 positions the stop 20 for normal running there is no feedback to the amplifier 24 so that the output of the amplifier 24 will be proportional to the expression:

$$T_{2t} - (T_1 + \alpha N^2)$$

The expression $T_1 + \alpha N^2$ in fact represents the value of $T_2$ during cold acceleration, providing that the constant $\alpha$ is correctly chosen for the engine in question, so that the amplifier 24 only produces an output when the temperature $T_{2t}$ differs from its computed value. This occurs, as mentioned above when the compressor gives up stored heat to the air during hot re-slam conditions, so that $T_{2t}$ exceeds $T_1 + \alpha N^2$ for a short time. This causes adjustment of the position of the stop 20 out of its normal position to restrict the acceleration fuel margin. The degree of adjustment is controlled by the feedback connection mentioned above.

In the example shown in FIG. 2 the stop 20 is not adjusted but, instead, there is a solenoid operated valve 25 which is connected via a restrictor 26 to the space between the orifices 16 and 17 and also to the space in the fuel flow control on the outside of the bellows. The solenoid valve 25 is spring loaded shut and, as shown in the drawing there is a feedback connection from the solenoid to the amplifier 24. Thus, in hot re-slam conditions, the output produced by the amplifier 24 causes the valve 25 to open a controlled amount thereby to reduce the pressure which is applied to the exterior of the bellows so as to cause movement of the sleeve 12 to the left and thus reducing the acceleration fuel margin.

In an alternative form of the invention the actual temperature of the material of the compressor is measured at a position adjacent the delivery end thereof. The calculated cold acceleration compressor temperature is computed as before from measured values of the inlet air temperature and the engine speed. This computed temperature is compared with the actual temperature and the amplified difference signal is used either to adjust the acceleration stop 20 or to operate a valve 25 to modify the air signals received by the pressure sensing unit. As a further alternative the actual compressor temperature may be compared with the computed cold acceleration temperature of the air delivered by the compressor.

As yet a further alternative the difference signal can be generated from two actual measured temperature signals. For example the temperature of the compressor material and the temperature of the air leaving the compressor may both be measured and compared in the summing network of the amplifier 24. An appropriate form of servo-mechanism is employed to move the stop 20 or open the valve 25 when the difference between these two temperatures indicates that hot re-slam conditions exist.

Alternative the system may use two temperature probes in the air stream discharged from the compressor. One probe gives a rapid response but the other has a suitable increased thermal inertia so that a difference in the signals indicates a change in temperature. A difference signal modifies the control characteristic as before. To obtain the required thermal inertia the said other probe may sense the air temperature in a chamber through which there is a slow flow of air tapped from the compressor delivery air stream. Alternatively the measuring probe itself may be lagged to provide the required inertia or the instrument with which it is associated may include an electronic or electro-mechanical delay arrangement.

I claim:

1. A fuel control system for a gas turbine engine including acceleration control means sensitive to a plurality of engine operating parameters for controlling the rate of flow of fuel to the engine in accordance with said parameters during acceleration of the engine, means sensitive to an engine condition in which air passing through the compressor of the engine is heated by heat stored in the compressor during previous deceleration and arranged to produce an electrical output during such a condition and means actuable by said output for reducing the maximum fuel flow to the engine permitted by said acceleration control means.

2. A fuel control system as claimed in claim 1 in which said means sensitive to said engine condition comprises an amplifier producing a signal which corresponds to the difference between the values of two engine parameters which differ only when said condition exists.

3. A fuel control system as claimed in claim 2 in which said amplifier produces a signal corresponding to the difference between the actual measured value of a parameter which fluctuates as a result of heat stored in the engine compressor and the computed value of the same parameter determined by measurement of other parameters which do not fluctuate as a result of heat stored in the compressor.

4. A fuel control system as claimed in claim 3 wherein the parameter which fluctuates as a result of heat stored in the compressor is the temperature of the air leaving the compressor, and said other parameters being the air temperature at the engine air intake and the speed of rotation of the engine.

5. A fuel control system as claimed in claim 4 which said amplifier has inputs from means for generating a first electrical signal of magnitude proportional to the square of the engine speed, means for producing a second electrical signal of magnitude proportional to the air intake temperature and means for producing a third electrical signal proportional to the temperature of air leaving the compressor and said amplifier produces an output signal proportional to the sum of the first and second signals less the third signal.

6. A fuel control system as claimed in claim 3 wherein the para-meter which fluctuates as a result of heat stored in the compressor is the temperature of the compressor and, said other parameters are the air temperature at the engine air intake and the speed of rotation of the engine.

7. A fuel control system as claimed in claim 2 in which the amplifier produces an output corresponding to the difference between two measured temperatures within the engine.

8. A fuel control system as claimed in claim 7 in which said temperatures are those of the compressor of the engine and the air leaving the compressor.

9. A fuel control system as claimed in claim 1 in which the means sensitive to said engine condition includes a difference amplifier supplied with a signal corresponding to the temperature of the air leaving the compressor and a delayed signal corresponding to the temperature of the air leaving the compressor.

10. A fuel control system as claimed in claim 9 including a pair of temperature probes for providing said signals, one of said probes measuring the actual temperature and the other having an increased thermal inertia.

11. A fuel control system as claimed in claim 10 in which said other probe is lagged.

12. A fuel control system as claimed in claim 10 in which said other probe is arranged to serve the temperature in a chamber connected to the compressor delivery end and arranged to receive a slow flow of air therefrom.

13. A fuel control system as claimed in claim 7 in which said means actuated by the output of the amplifier provides a stabilizing feedback signal to the amplifier.

14. A fuel control system as claimed in claim 13 in which said means actuated by said output comprises a servo-motor connected to a stop arranged to limit movement of a part which is movable in response to one or more of said engine operating parameters and which controls the flow of fuel to the engine.

15. A fuel control system as claimed in claim 1 in which said acceleration control means includes pressure sensing means connected to the engine compressor and in which said means actuable by said output includes a valve connected to said pressure sensing means for varying the pressure applied thereto when said engine condition occurs

* * * * *